United States Patent [19]

Norbäck

[11] Patent Number: 4,459,244
[45] Date of Patent: Jul. 10, 1984

[54] DEVICE FOR CONTACTORS FOR USE IN COOLING TOWERS AND THE LIKE

[75] Inventor: Per Norbäck, Askrikevägen, Sweden

[73] Assignee: AB Carl Munters, Sollentuna, Sweden

[21] Appl. No.: 285,825

[22] Filed: Jul. 22, 1981

[30] Foreign Application Priority Data

Dec. 10, 1980 [SE] Sweden ............................. 8008691

[51] Int. Cl.³ .............................................. B01F 3/04
[52] U.S. Cl. ........................... 261/112; 261/DIG. 11;
      261/DIG. 85; 428/182; 428/185
[58] Field of Search ....... 261/112, DIG. 11, DIG. 44,
      261/DIG. 77, DIG. 85; 55/257 R, 257 PV;
      405/119; 52/11, 13, 12; 428/182, 184, 185

[56] References Cited

U.S. PATENT DOCUMENTS

| | | | |
|---|---|---|---|
| 2,573,491 | 10/1951 | Richardson | 261/112 |
| 3,265,550 | 8/1966 | Lindquist | 261/112 X |
| 3,415,502 | 12/1968 | Munters | 261/DIG. 11 |
| 3,526,393 | 9/1970 | Meek | 261/112 X |
| 3,738,626 | 6/1973 | Norback | 261/112 |
| 3,983,190 | 9/1976 | Norback | 261/112 X |
| 4,096,214 | 6/1978 | Percevaut et al. | 261/112 X |
| 4,218,408 | 8/1980 | Henning et al. | 261/112 |
| 4,225,540 | 9/1980 | Kauschke | 261/112 |

Primary Examiner—Richard L. Chiesa
Attorney, Agent, or Firm—Curtis, Morris & Safford

[57] ABSTRACT

Device for a contactor (10) for liquid and gas, e.g. for use in cooling towers and the like, such contactor being built up of mutually spaced membranes (12, 14) forming ducts for the passage of a fluid introduced at the top of the contactor and collected in a trough or channels below the membranes. In order to be able to collect the liquid passing through the contactor immediately beneath the lower surface of the latter, thereby reducing the pumping height without appreciably affecting the flow conditions of the air passing through the contactor, the contactor (10) is provided with surfaces to carry of the liquid which are inclined at an angle relative to the horizontal and are connected to at least one collecting channel or trough (16), these surfaces serving to carry the liquid passing out of the contactor into the collecting channel (FIG. 1).

4 Claims, 12 Drawing Figures

DEVICE FOR CONTACTORS FOR USE IN COOLING TOWERS AND THE LIKE

The present invention is concerned with a contactor for liquid and gas, e.g. for use in cooling towers and the like, such contactor being built up of mutually spaced membranes forming ducts for the passage of a fluid introduced at the top of the contactor and collected in one or more collecting channels located below the membranes.

For example, in cooling towers built up of contactors of the type described in the introductory paragraph, the liquid, e.g. water, introduced into the tower by means of a distributor located above the contactors, having passed through the contactors is collected in a basin beneath the tower. After it has been put to the required use, as a coolant for example, the water is then recirculated via a circulation system to a point above the contactors where it is reintroduced into the tower by the distributor. The basin in which the liquid is collected must therefore, at least in cooling towers designed on the counterflow principle, be located at a relatively large distance from the under surface of the contactors so as to allow introduction of the gas, such as air, which is to flow upwards through the contactors and discharge itself at their upper surface. The principle of using a collection basin into which the water falls freely from an appreciable distance above has the disadvantages that the water, as it falls into the basin, makes a noise which may be disturbing for the surroundings and that it must be pumped up from a level considerably lower than the under surface of the contactors, which requires large amounts of energy. Attempts have therefore recently been made to collect the water at point close to or immediately beneath the under surface of the contactors, i.e. at a much higher level than previously, thus reducing the amount of noise in operation and saving energy in that the pumping height is thereby considerably reduced.

A known method of achieving this is to provide troughs connected to each of the membranes of the contactor for the purpose of collecting and leading off the water flowing down the surface of the membranes. The suggestion has also been made to form or press out such collection troughs in the actual material of which the membranes are made and to set them or the entire contactor at an inclination towards one or both their ends in such manner that the water is able to run off into larger collection tanks or channels. However, not only is the provision of such troughs on each membrane both complicated and costly, but the troughs themselves intrude upon the space between adjacent membranes and narrow the passage available for the upward flow of air, thereby causing an undesirable increase in the pressure drop over the contactor.

The chief objective of the present invention is thus to achieve a device for use with contactors of the type described above which allows collection of the liquid passing through the contactor immediately beneath the lower surface of the latter without having any appreciable effect on the flow conditions of the gas and liquid passing through the contactor. A further objective is to achieve a device of this nature both cheap and simple to manufacture and install, while it is also the aim to design such device which, besides helping to simplify and improve installation and suspension of the contactor, in certain embodiments also serves to stiffen the contactor itself.

These and other objectives and advantages are achieved in that the device of the invention is provided with the characteristics to be described in the claims to follow.

The invention will be described in greater detail in the following paragraphs with reference to the embodiments illustrated in the accompanying drawings.

In FIG. 1, the drawing executed in solid lines shows in perspective a contactor incorporating a collecting device, designed according to the principles of the invention, while that executed in broken lines indicates adjacent contactors.

FIG. 2 shows another embodiment of a contactor designed according to the principles of the invention in a perspective similar to that of FIG. 1.

In FIG. 3, the solid lines show a side elevation of a contactor as per FIG. 1, the broken lines showing an adjacent contactor.

Figure 7A:
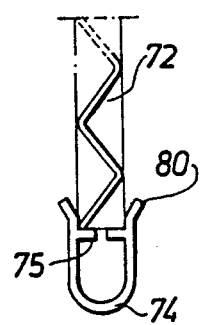
FIG. 7 shows an end view of another modification of the embodiment.
Figure 7:
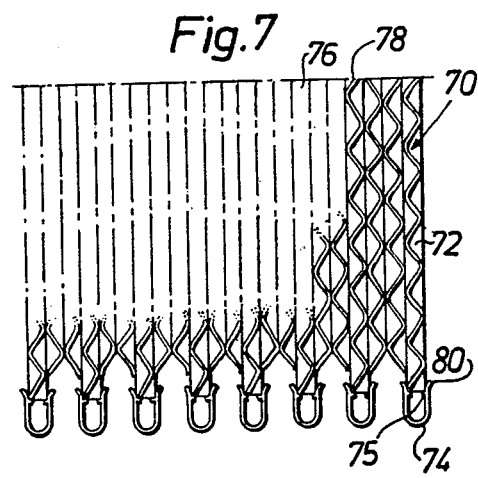

FIG. 7a showing, in greater detail, the under part of the contactor illustrated in FIG. 7.

Figure 8:
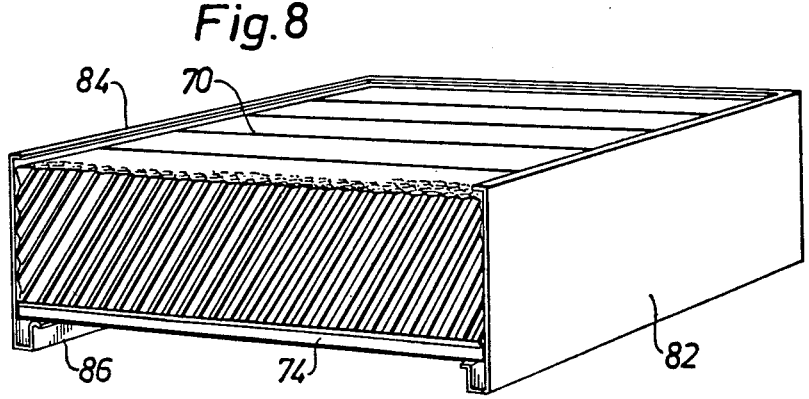

FIG. 8 shows a perspective of the contactor of FIG. 7 mounted in a box-like frame.

Figure 9:
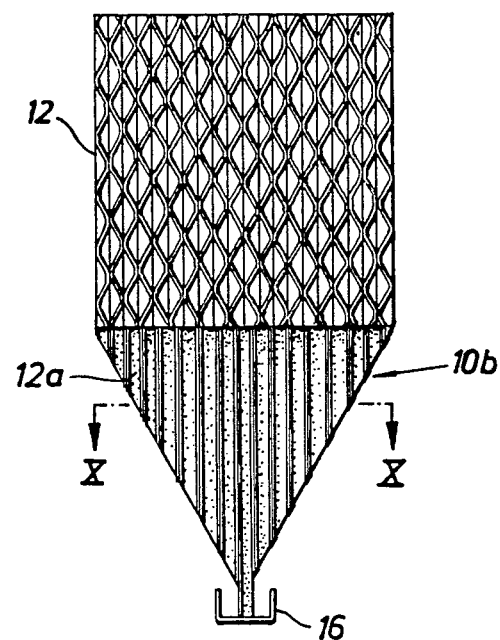

FIG. 9 shows a modified embodiment of the contactor of the invention.

Figure 10:
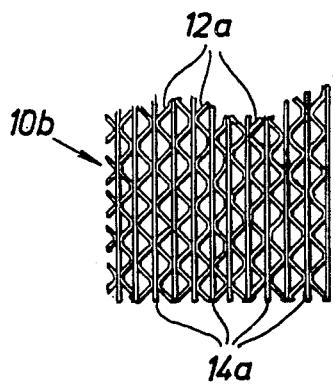

FIG. 10 shows a section on the line X—X in FIG. 9.

Figure 11:
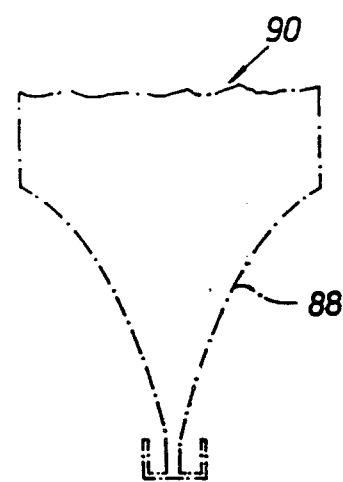

FIG. 11 shows a further embodiment of a contactor designed according to the principles of the invention.

Figure 1:
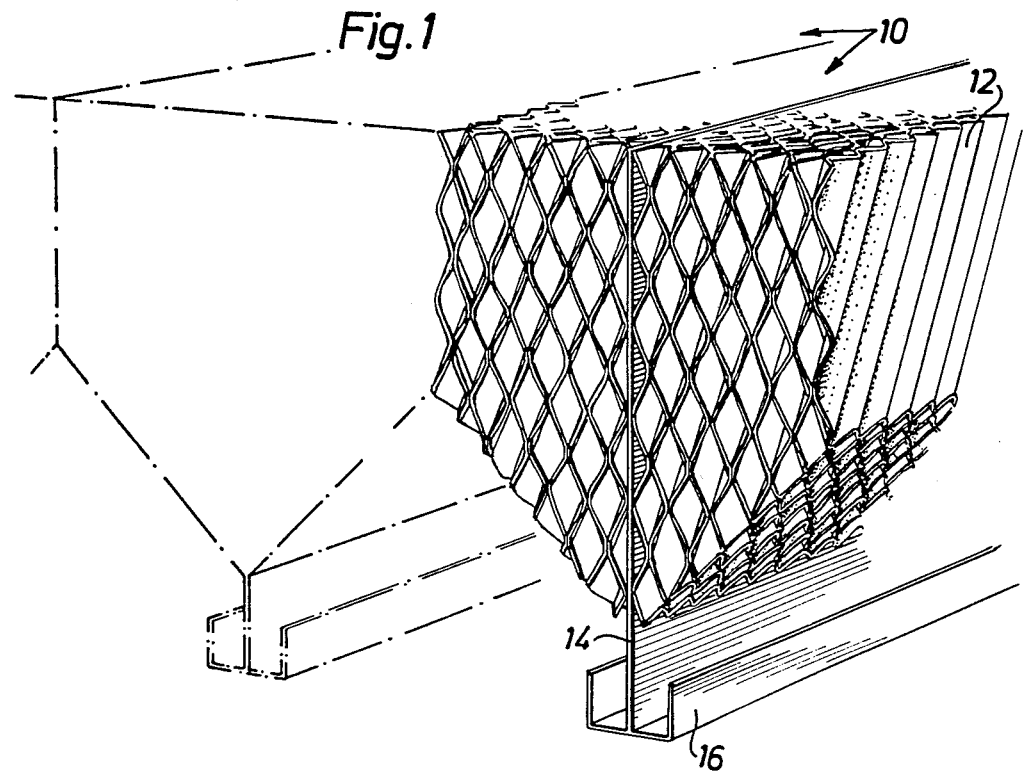

In the embodiment illustrated in perspective in FIG. 1, a contactor 10 is built up of thin layers or membranes 12 which, in the embodiment illustrated here, are corrugated or folded. All the membranes are set vertically, and the furrows or corrugations of the folded membranes cross each other at an angle relative to the vertical. These membranes, which should be made of some suitable material such as plastic, metal, or the like, bear upon each other and are united at their points of contact by some suitable method such as gluing, welding, etc. Liquid, such as water, flows down from above, while some gas, such as air, flows through the contactors 10 from below, in an opposite direction, in the through ducts formed by the membranes.

In the device of the invention illustrated in FIG. 1, two such contactors 10 are mounted on opposite sides of a flat, central membrane 14. This membrane 14, which is of the same length as the contactors 10, also runs from the top surface of the contactors 10 to a point located somewhat below their lower surface. The lower edge of the membrane 14 is united to a trough or channel 16 of U section which should preferably be made of the same material as the membrane 14 itself and be united to the latter during manufacture or by some suitable method of attachment. Although the membrane 14 may be of the same material as the membranes designated 12, e.g. PVC plastic, it would be preferable to use a material having greater thermal resistance than these, e.g. reinforced plastic or some thermosetting resin such as Noryl. The membrane 14 may also be of metal, e.g. aluminium, steel or the like, as may the membranes denoted by the figure 12. The trough 16, as shown in the side elevation of FIG. 3, is mounted on supports, as will be described in greater detail below, thus enabling the trough 16 to provide support for the contactors 10 in the form of the membrane 14, the contactors 10 being united to the membrane 14 by gluing or other suitable means.

In order to lead the liquid passing through the contactors 10 into the collecting trough 16, the under surface of the contactors 10 is cut obliquely downwards towards the trough such that the bottom of the contactors 10 on either side of the membrane 14 forms a V shape. After the liquid, such as water, has passed through the ducts of the contactor 10, it will follow the oblique under surfaces down to the pointed end of the contactor where most of it will be led over the surface of the membrane or reinforcing plate 14 and down into the trough 16, whence it continues to a further collection system to be described below.

Figure 4:
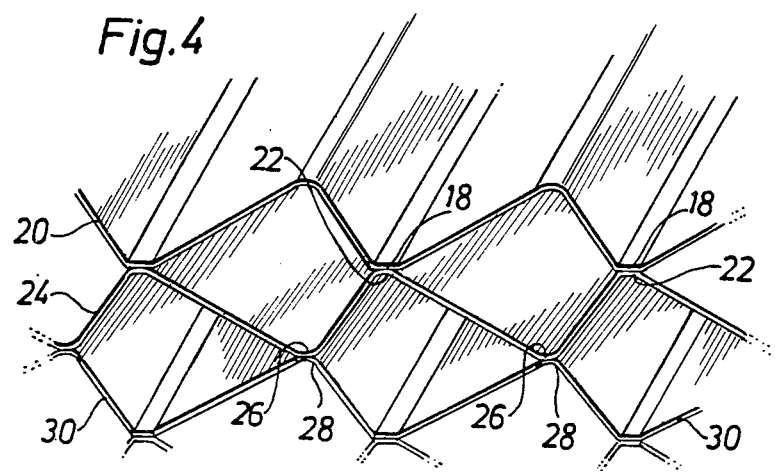
FIG. 4 shows a perspective on a larger scale of the under surface of the contactor of FIGS. 1 and 3.

If the drainage system described as being formed by the under surface of the contactors 10 is to work, it is important that the pointed teeth of the outer membranes bear upon the ridges of an adjacent, underlying membrane so as to hinder the liquid or water from falling off the tooth, as would be the case if the latter projected freely out into space. This principle is illustrated in FIG. 4, which shows a side elevation of the oblique under surface of the contactor 10 on a large scale. From the Figure it is clear that the teeth 18 of the outer membrane 20 rest on the ridges 22 of the underlying membrane 24 and are inside its edge, the teeth 26 of the latter membrane in turn resting in similar fashion upon the ridges 28 of the next underlying membrane 30. Since the water flows along the edges of the obliquely cut membranes down to the surface of the reinforcing plate 14, the ducts formed by the furrows of the membrane 12 will not be blocked by the water but will allow the air rising from below free passage into the ducts.

Figure 3:
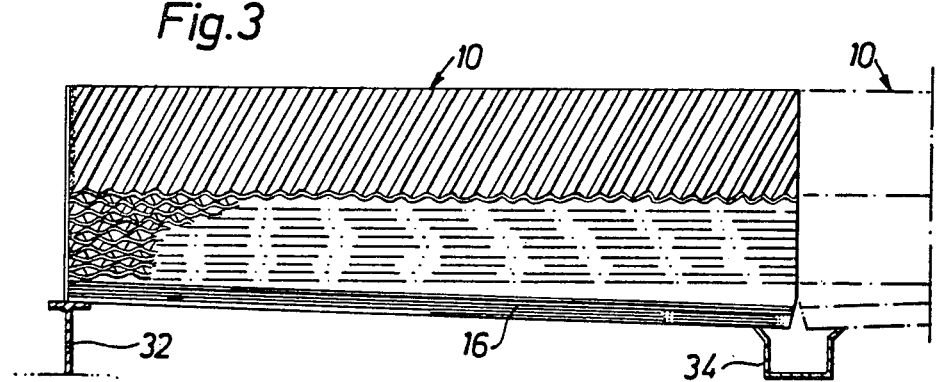

The collection trough 16, as shown in FIG. 3 and described above, rests on supports, 32 and 34, of which the latter has the form of a channel into which the troughs 16 empty their water. This may be achieved by setting the contactor 10 at an inclination, as illustrated in FIG. 3, in that its lower edge runs at an angle to the contactor 10 in a longitudinal direction. As illustrated in FIGS. 1 and 3, several contactors 10 may be connected, both laterally and longitudinally, in order to achieve a cooling tower bed of the desired size. Since the contactors 10 are connected to the reinforcing plate 14 as illustrated in the drawing, which membrane also serves to drain off the water, the contactors are stiffened sufficiently to allow a large distance between their points of suspension, i.e. in the present case the collection troughs 16 supporting the contactors 10. By this means, the obstacle hindering the air from entering the tower represented by the collecting troughs 16 running under that part of the contactors 10 adjacent to the reinforcing membrane 14 will be negligible by comparison with the free area of the under side of the contactors left exposed between the troughs 16. Furthermore, since the upper edge of the trough 16 is situated at some distance away from the closest part of the oblique under surface of the contactor 10, air is able to flow into the ducts lying closest to the membrane 14. As mentioned above, this plate or membrane 14 is stronger than the other membranes 12 of the contactor 10, being in the present case more resistant to temperature, and to this end should be of some suitable material such as metal or thermosetting resin, e.g. Noryl or the like.

Figure 2:
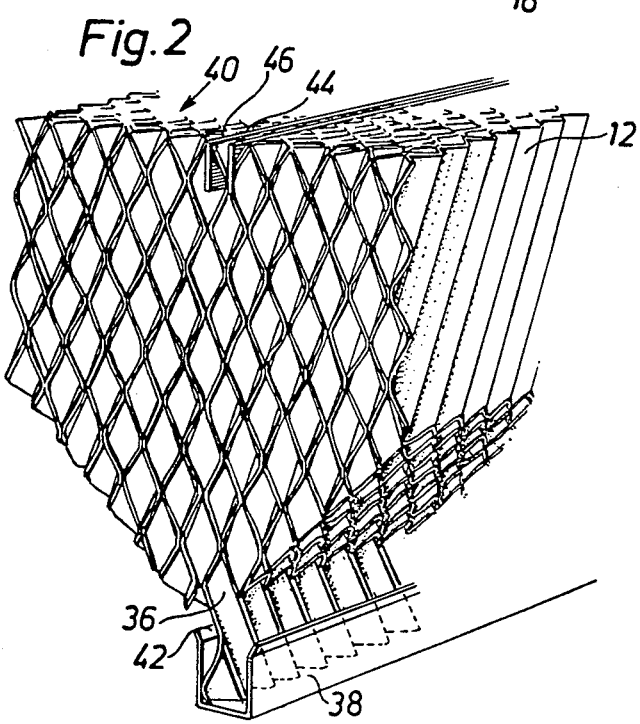

In the embodiment illustrated in FIG. 2, a contactor 40 is built up of corrugated membranes 12 in the same manner as already described for the embodiment of FIG. 1. A reinforcing membrane 36, also corrugated, is provided at the centre of the contactor 40 of FIG. 2 with ridges of the same height and at the same distance apart as the membranes denoted by the numeral 12, such reinforcing membrane 36 being, however, of a stronger material such as thermosetting resin or metal, as described above, and running for some distance below the other membranes of the contactor 40. On either side of the membrane 36 the under surface of the contactor 40 is cut obliquely to form a V shape, the apex of which coincides with the reinforcing membrane 36. All membranes, 12 and 36, are mutually united by gluing, welding or the like, as described above, and a collection trough 38 having the same function as that 16 described for the embodiment of FIG. 1 is attached to the lower edge of the reinforcing membrane 36. In order to improve collection of the water flowing into the channel after leaving the reinforcing membrane 36, the upper edges of the trough itself 38 may be provided with a suitably shaped lip 42. In the embodiment illustrated in FIG. 2, two strips or stiffeners, 44 and 46, are attached, e.g. by gluing or welding, on either side of the contactor 40 near its upper surface and, besides serving to stiffen the whole, may also be used to secure the contactor into the framework of the cooling tower.

Clearly, the V-shaped part of the contactor illustrated in FIGS. 1 and 2 may also be designed as a separate unit to be mounted beneath the horizontal surface of the contactors used in the cooling tower. Should such design be preferred, this lower, separate V-shaped unit may also be used to suspend and give support to the rectangular contactors above.

FIGS. 9 and 10, therefore, show a modified embodiment of a contactor of the type envisaged in the invention in which, like the embodiment of FIG. 11 and 2 for example, the upper part 10a is built up of thin, adjacent, corrugated membranes 12. The lower, conical unit 10b, however, is formed of straight, vertical ducts since the corrugated membranes 12a are assembled with their furrows running vertically, the central membrane being provided with a channel or trough 16 as described above. In the embodiment illustrated here, moreover, the corrugated membranes 12a alternate with plane membranes 14a.

Figure 5:
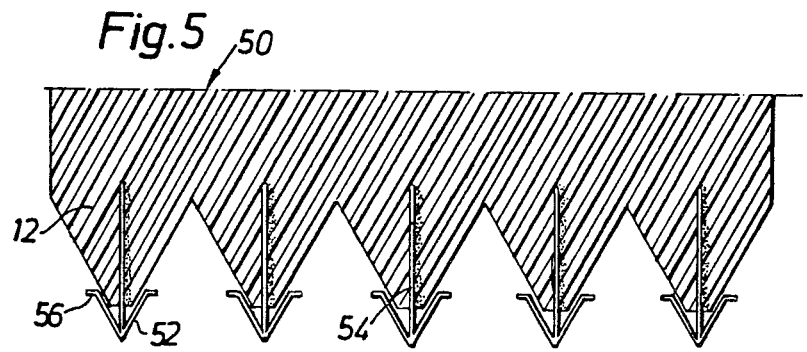
FIG. 5 shows a side elevation of a contactor provided with a collection device designed according to another embodiment of the invention.

In the embodiment illustrated in FIG. 5, at several points along its lower end the contactor 50 is cut obliquely across the plane of the membranes 12, i.e. at a right angle in relation to the obliquely cut surface shown in FIG. 1, thus forming a number of V-shaped teeth. Below these are suspended V-shaped collection troughs 52 united to a reinforcing plate 54 projecting into the contactor. In order to provide sufficient space for the liquid falling through the tower, the tops of the V-shaped teeth may be cut off such that the end of the actual contactor will be some distance above the bottom of the trough 52. The trough itself may be provided with outward-projecting lips 56 so as to prevent the water from running off down the outside of the trough 52.

Figure 6:
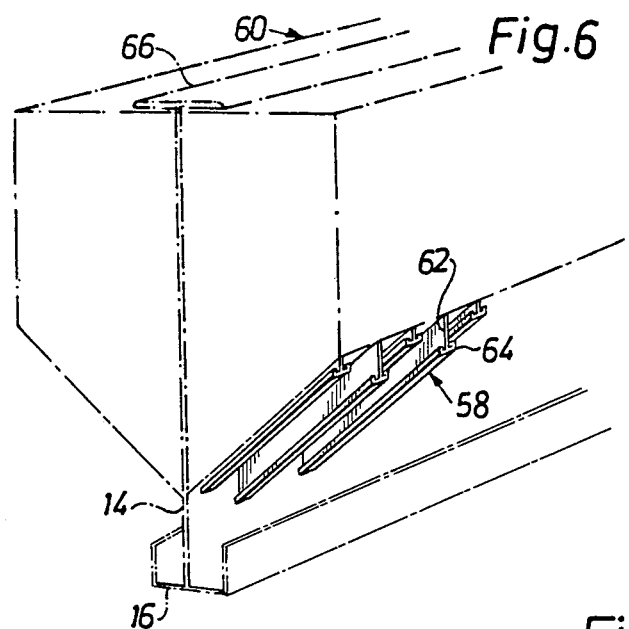
FIG. 6 shows, in perspective, an end view of a contactor similar to that of FIG. 1 but having a modified embodiment of the collection device.

In the embodiment illustrated in FIG. 6, in which the same numerals are used to denote those parts common to both this and the embodiment of FIG. 1, the oblique surfaces of the under part of the contactor 60 are provided with a gridiron-like series of strips 58, each of which comprises a vertical plate 62 and a trough of U section 64 running along the lower edge of the plate 62. Each strip 58 runs entirely across the oblique surface of the contactor as far as the reinforcing plate 14. Any water not flowing along the oblique lower edges into the trough 16 but falling off the surface of the contactor will hence be caught by the troughs 64 attached to the strips 58 and so be led down into the trough denoted 16. By mounting alternate strips at a distance below the surface different from the one immediately preceding, as illustrated in FIG. 6, the screening effect which the series of strips would otherwise have on the air flowing in at the under surface of the contactor 60 can be reduced. FIG. 6 also illustrates how the reinforcing plate 14 may project slightly above the upper surface of the contactors 60 and be provided with a transverse strip 66 running along the reinforcing plate 14 for the purpose of providing added stiffness to the latter 14.

In the embodiment of the contactor 70 illustrated in FIGS. 7 and 8, a collection trough 74 of U section is suspended under every third membrane 72, the under edges of these membranes being cut straight. Each side of the trough 74 is provided with a horizontal ledge or lip 75 projecting inwards on which the membrane 72 rests, thus ensuring that the contactor 70 will be supported by all the troughs 74 via the membranes here denoted 72. The lower edges of the membranes 76 lying on either side of the membranes denoted 72 are cut obliquely to run in a downward direction towards the membrane 72 lying centrally between them. In such manner three membranes, namely the central membrane denoted 72 and the membranes 76, 78 on either side thereof, will drain off into each trough 74. As shown in FIG. 7, the upper part of the edges of each of the troughs of U section 74 may be folded outwards 80 so as to prevent water from running down the outside of the trough. FIG. 8 shows the contactor 70 built into a box-like frame 82, which may be of fibreglass-reinforced plastic, metal, or some similar material. The upper edge of the frame 82 is provided with a reinforcing rib 84 projecting inwards, while at least two of its edges are provided with a rib forming a trough 86. In this embodiment, the contactor 70 is mounted in the frame 82 in such manner as to allow the drains or troughs 74 to rest on the corresponding trough-shaped ribs 86 with a clearance between it and the walls of the box-like frame 82 such that the water collected by the troughs 74 can drain off to those designated 86, whence it is led to the circulation system, which is not illustrated here.

The conical, lower section of the contactor 90, as shown in the embodiment of FIG. 11, may have oblique, curvilinear surfaces 88 instead of the flat surfaces illustrated in previous embodiments, the degree of curvature being adapted in the most suitable fashion to suit the fluid passing through the contactor. Although the present figure shows a concave surface, other curves, convex or otherwise, are of course conceivable for certain applications.

Clearly, the invention is not limited to the embodiments illustrated and described in the present but may be extremely widely varied without departing from the underlying concept of the invention.

I claim:

1. A liquid and gas contactor for use in cooling towers of the type wherein the contactors are positioned at a substantial distance above a basin designed to collect liquid passing through the contactor, the contactor comprising:

a plurality of membranes spaced apart to form therebetween ducts for the passage of liquid through the ducts by being introduced at the upper portion of the contactor, at least a majority of the membranes being corrugated and having ridge portions on the corrugations and so positioned that alternate corrugated membranes have their corrugations directed at an angle to the corrugations of the next corrugated membrane, the lower portion of the membranes being obliquely cut, collection trough means integrally connected to the membrane portion of the contactor and adjacent to the obliquely cut lower portion of the membranes, whereby liquid discharging from a plurality of the ducts formed by the membranes travels along the obliquely cut portion and may be collected in the trough means, and a reinforcing member provided in the contactor for supporting the collection trough means, the reinforcing member projecting beneath the lower portions of the membranes and being connected to the collection trough means.

2. A liquid and gas contactor as defined in claim 1 wherein the obliquely cut membranes are formed so that the outer membranes bear upon the ridges of the corrugations of an underlying membrane to guide liquid from passing through the formed ducts from above to the underlying membrane towards the collection trough means and hinder the liquid from falling off the obliquely cut portion.

3. A liquid and gas contactor as defined in claim 2, wherein the adjacent membranes are corrugated.

4. A liquid and gas contactor as defined in claim 1 and wherein the collection trough means includes a collection trough beneath the obliquely cut portion and said collection trough connecting to a central collection device.

* * * * *